US011475009B2

(12) United States Patent
Li et al.

(10) Patent No.: US 11,475,009 B2
(45) Date of Patent: Oct. 18, 2022

(54) INTELLIGENT MEMORY ALLOCATION AND DEALLOCATION OF DATA

(71) Applicant: eBay Inc., San Jose, CA (US)

(72) Inventors: Tianyou Li, Shanghai (CN); Wen Liu, Shanghai (CN); Rongguan Fu, Shanghai (CN)

(73) Assignee: eBay Inc., San Jose, CA (US)

( * ) Notice: Subject to any disclaimer, the term of this patent is extended or adjusted under 35 U.S.C. 154(b) by 28 days.

(21) Appl. No.: 17/070,234

(22) Filed: Oct. 14, 2020

(65) Prior Publication Data

US 2022/0114177 A1 Apr. 14, 2022

(51) Int. Cl.
*G06F 16/00* (2019.01)
*G06F 16/2455* (2019.01)
(Continued)

(52) U.S. Cl.
CPC .... *G06F 16/24552* (2019.01); *G06F 12/0871* (2013.01); *G06F 16/254* (2019.01); *G06F 16/285* (2019.01); *G06F 16/289* (2019.01)

(58) Field of Classification Search
CPC . G06F 8/441; G06F 8/443; G06F 8/41; G06F 8/4435; G06F 9/30098; G06F 9/384; G06F 11/3409; G06F 11/3466; G06F 2201/865; G06F 8/433; G06F 8/437; G06F 9/30145; G06F 9/3838; G06F 9/3851; G06F 9/4552; G06F 8/44; G06F 8/445; G06F 8/447; G06F 21/52; G06F 12/0875; G06F 12/1408; G06F 12/1458; G06F 15/78; G06F 21/6218; G06F 2212/1052; G06F 2212/402; G06F 2212/452; G06F 9/30072;
(Continued)

(56) References Cited

U.S. PATENT DOCUMENTS 6,453,404 B1 9/2002 Bereznyi et al.
6,473,773 B1 * 10/2002 Cheng ................... G06F 9/4488
707/999.103

(Continued)

OTHER PUBLICATIONS

"Adaptive Query Execution—The Internals of Spark SQL," Retrieved from the Internet URL: https://jaceklaskowski.gitbooks.io/mastering-spark-sql/content/spark-sql-adaptive-query-execution.html, Accessed On Oct. 16, 2020, 1 page.

(Continued)

*Primary Examiner* — Shyue Jiunn Hwa
(74) *Attorney, Agent, or Firm* — Shook, Hardy & Bacon L.L.P.

(57) ABSTRACT

A database object used in a plurality of database operations is determined. A live range of the database object is computed. The computing of the live range includes determining occurrences of the database operations to the database object. Based at least in part on the live range of the database object, a memory is determined to be optimally assigned to store the database object based on at least one characteristic of the memory. A first time to allocate the database object to the memory is determined. A second time to deallocate the database object from the memory is determined. An output file comprising a first instruction to store the database object in the memory at the first time and a second instruction to deallocate the database object from the memory at the second time is written.

20 Claims, 8 Drawing Sheets

(51) Int. Cl.
*G06F 16/25* (2019.01)
*G06F 12/0871* (2016.01)
*G06F 16/28* (2019.01)

(58) Field of Classification Search
CPC .... G06F 9/30101; G06F 9/3867; G06F 21/00; G06F 21/50; G06F 21/552; G06F 21/57; G06F 21/6209; G06F 2221/034; G06F 9/3013; G06F 9/4401; G06F 9/445; G06F 11/3612; G06F 11/362; G06F 16/2308; G06F 21/125; G06F 21/14; G06F 2221/07; G06F 9/449
See application file for complete search history.

(56) References Cited

U.S. PATENT DOCUMENTS

| | | | | |
|---|---|---|---|---|
| 6,636,866 | B1* | 10/2003 | Ramalingam | G06F 16/25 |
| 7,434,105 | B1* | 10/2008 | Rodriguez-Rivera | G06F 11/073 714/38.1 |
| 9,501,518 | B2 | 11/2016 | Lingamneni | |
| 10,404,596 | B2* | 9/2019 | Ghosh | G06F 3/061 |
| 2019/0104067 | A1* | 4/2019 | Ghosh | G06F 3/061 |
| 2020/0379740 | A1* | 12/2020 | Paek | G06N 3/0454 |

OTHER PUBLICATIONS

"Archival Storage, SSD & Memory," Retrieved from the Internet URL: https://hadoop.apache.org/docs/current/hadoop-project-dist/hadoop-hdfs/ArchivalStorage.html, Accessed On Oct. 16, 2020, 5 pages.

"Centralized Cache Management in HDFS," Retrieved from Internet URL: https://hadoop.apache.org/docs/current/hadoop-project-dist/hadoop-hdfs/CentralizedCacheManagement.html, Accessed On Oct. 16, 2020, 6 pages.

Khalil et al., "Survey of Apache Spark Optimized Job Scheduling in Big Data", International Journal of Industry and Sustainable Development (IJISD), vol. 1, No. 1, Jan. 2020, pp. 39-48.

Wimmer, "Linear Scan Register Allocation on Static Single Assignment Form", Department of Computer Science, Retrieved from Internet URL: http://cgo.org/cgo2010/talks/cgo10-ChristianWimmer.pdf, Apr. 2010, 13 pages.

Kuck et al., "Dependence Graphs And Compiler Optimizations," Proceedings of the 8th ACM SIGPLAN-SIGACT Symposium on Principles of Programming Languages, Jan. 1981, pp. 207-218.

Pereira, "A Survey on Register Allocation," Retrieved from the Internet URL: https://homepages.dcc.ufmg.br/~fernando/classes/dcc888/readingMat/RegisterAllocationSurvey.pdf, Oct. 12, 2008, 20 pages.

* cited by examiner

INTELLIGENT MEMORY ALLOCATION AND DEALLOCATION OF DATA

BACKGROUND

Users may issue one or more queries to write data to or read data from a database. Such queries are indicative requesting one or more database operations to be executed on one or more database objects. For example, database operations can include inserting a record into a database object (e.g., a database table, a view, a partition of data, or any other set of data stored in a database), deleting data from a database object, updating data in a database object, reading data from a particular field where a row and column meet, joining information from database objects, and the like. For example, in a Structured Query Language (SQL) context, a query may include specific INSERT, SELECT, UPDATE, DELETE, and CREATE TABLE statements.

To execute queries or schedule corresponding database operations, existing technologies typically do not adequately provide explicit memory allocation and/or deallocation control of database objects. This is problematic especially in distributed computing contexts where these database operations are processed across clusters of computers. If explicit control allocation/deallocation is not adequately performed, database objects such as tables may be arbitrarily swept into and out of memory, which causes performance degradation and unnecessary computing resource consumption among other things, as described in more detail herein.

BRIEF SUMMARY

Particular embodiments of the present disclosure include a computer-implemented method, a non-transitory computer storage medium, and a system. Some aspects are directed to improving database technologies by providing explicit memory allocation and/or deallocation control of database objects, which improves functionality and computing resource consumption, among other things. For example, by finely tuning when database objects are allocated and deallocated from memory, performance as well as overall memory utilization may be optimized. Still further, scalability of the system may be improved by allowing for highly parallel operations to be coordinated across computing nodes. Other advantages, embodiments, improvements and the like are described herein.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE SEVERAL VIEWS OF THE DRAWINGS

The present technology is described in detail below with reference to the attached drawing figures, wherein.

DETAILED DESCRIPTION

Figure 1:
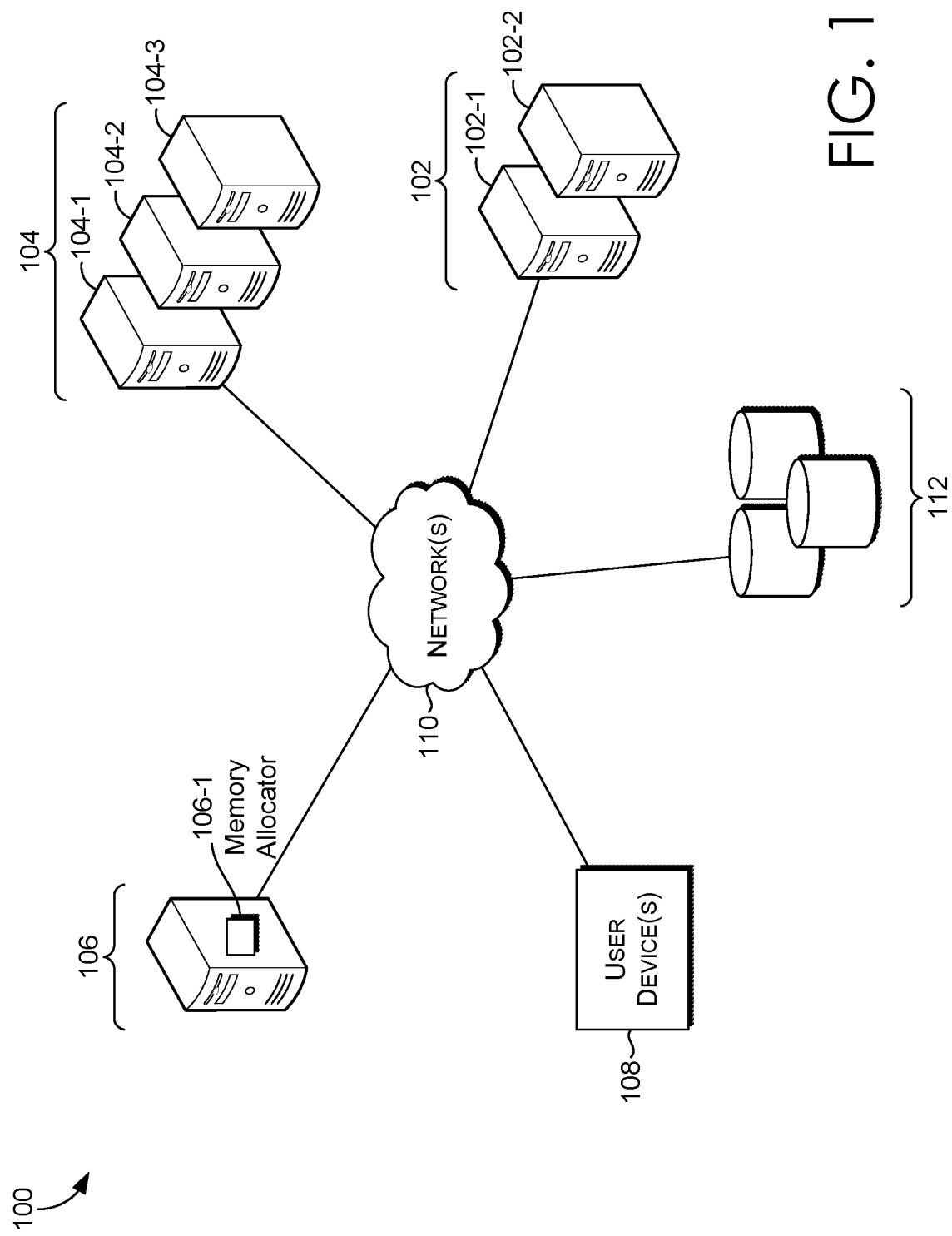
FIG. 1 is a schematic diagram illustrating an example operating environment in which particular embodiments of the present disclosure may be employed.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different components of methods employed, the terms should not be interpreted as implying any particular order among or between various steps herein disclosed unless and except when the order of individual steps is explicitly described.

Existing technologies process database operations using various optimizations. For example, existing technologies attempt to use cluster resources to reduce the overall runtime of Extract Transform and Load (ETL) jobs. A "cluster" refers to two or more computing device hosts (also referred to as "nodes") that are communicatively coupled (e.g., via a Local Area Network (LAN)) and work together to execute one or more computer operations. Using clusters typically improves performance and availability relative to a single computer. ETL refers to the concept of pulling (or copying) data from one or more source databases and writing the pulled data into a target data store (e.g., a data warehouse). ETL and other processes may include various jobs that need to be scheduled and performed. Scheduling a job may include determining when the job needs to be executed. A "job" as described herein includes one or more database operations (e.g., update, delete, read, insert) that are performed to execute a database command or query. In various embodiments a job is additionally or alternatively a unit of work (e.g., a series of database operations) that a computer operator (e.g., a job scheduler) gives to an operating system so that the operating system can perform the jobs.

In some cases, these jobs are computationally or performance intensive (e.g., they require terabytes of memory consumption). For example, HADOOP systems may need to perform data mining or big data analysis to reveal patterns, trends, and associations, which is computationally expensive. These systems as well as other conventional technologies use scheduling optimizations, such as parallel runs for jobs which do not have data dependencies, remove data skew by rewriting of SQL, and use bucket joins to avoid data shuffle, and the like. However, a technical problem with these solutions and others is that they attempt to solve computational or performance problems at the per-query granularity meaning that jobs are scheduled based on a single query or job that is received. Accordingly, many existing technologies do not optimize or schedule a particular database operation or job based on information regarding multiple other pending database operations or jobs (e.g., jobs that are dependent on a current job).

Moreover, existing technologies typically do not adequately provide explicit memory allocation and/or deallocation control of database objects. A "database object," as described herein refers to any suitable database component, such as one or more database tables, a database view, one or more columns of a database table, one or more rows of a database table, or any other database partition or part. If explicit control allocation/deallocation is not adequately performed (especially for multiple pending database operations or pending jobs across computing nodes), database objects may be arbitrarily swept into and out of memory. What this means is that there are unnecessary computer I/O costs. Specifically, when data is read from a disk storage device, for example, it is typically read into memory (e.g., RAM or cache) but there is no guarantee how long the data will remain in memory without adequate and explicit memory control. This means that data, such as database objects, can be and often are deleted or "swept" out of memory such that the only way to retrieve the data is via disk. This is computationally expensive because disk I/O requires mechanical read/write head movements to locate corresponding sectors and data on disk. This also wastes power and energy resources due to the mechanical movements of the read/write head. Additionally, continuous read/write head movements cause mechanical breakage and I/O errors after extensive use, among other things. Additionally, due to increased I/O there are related problems with throughput, as well as network latency, among other things. For example, at the front end a client may issue a query. Responsively, packet headers and a payload are generated and transmitted over a network. A backend server, may then have to repeatedly reach out to disk for each job and/or database operation requested before sending packets back to the client over the network. This increases network latency as well as decreases throughput.

Additionally, in distributed systems, where memory allocation may be at the cluster level (e.g., "cluster caches"), computer resources are unnecessarily consumed because the cluster (or one or more nodes of the cluster) may be too busy performing other operations. Accordingly, if a job or set of queries are assigned to a cluster but that cluster is not able to immediately handle the set of queries, the set of queries may be placed in a memory-intensive queue data structure waiting to be processed among several other jobs that are first in line, which increases network latency, decreases throughput, and puts unnecessary strain on CPU resources.

Various embodiments of the present disclosure provide one or more technical solutions to the technical problems described above, as well as other problems. For example, some embodiments improve existing technologies by providing explicit memory allocation and/or deallocation control of database objects. For example, some embodiments schedule a job by writing an output file that includes an instruction to store the database object in cache (or other memory) at a first time and another instruction to deallocate the database object from the case at a second time. In an illustrative example, particular embodiments can specify that at time 1, 2 GB of memory from cluster 1 should be allocated to table A for the next 2 hours (ending at time 2). In this way, tables are not arbitrarily swept into and out of cache, thereby reducing I/O since particular database objects associated with particular database operations are essentially guaranteed to stay in memory for the duration of a set of pending database operations or job (and/or dependent jobs). Accordingly, embodiments do not have to continually reach out to disk, thereby improving I/O, network latency, CPU utilization, as described above.

In some embodiments, the particular explicit memory allocation and/or deallocation control of database objects of a first job is based on other jobs that use the same database objects, such as dependent jobs of different queries that need to access (e.g., read from or write to) the same database object. A "dependent job," "job dependency," "dependency," and similar terms used herein refers to a job or set of database operations that starts depending on the state of one or more other jobs or database operations. Put differently, the job will not start unless and until a particular state of another job is met (e.g., a first job must first be completed before a second job starts). For example, job "B" cannot start while job "A" is not finished. In an illustrative example, if a query requests information from various tables, an output of the request may be a first job that combines or joins views from multiple tables. However, this first job may require other jobs to be completed first, such as reading particular columns and/or rows from the respective tables in order to perform the join operation.

Figure 3:
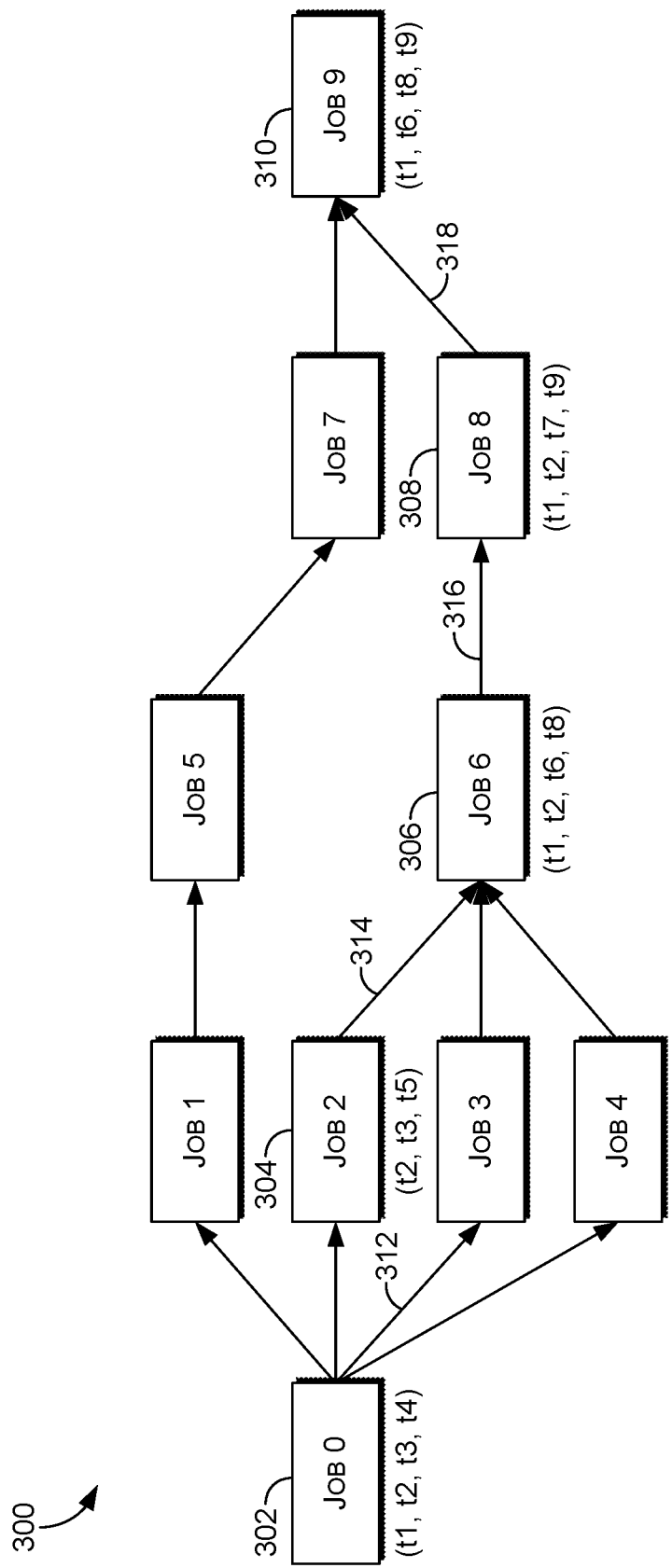
FIG. 3 is a block diagram of an acyclic directed graph (DAG) illustrating job dependencies and database objects, such as tables, needed to complete each job, according to particular embodiments.

A common source of unnecessary computing resource consumption among ETL and other jobs is a large number of job dependencies or database operations. Some embodiments provide explicit memory allocation/deallocation of one or more database objects accessed by one or more database operations based on computing a live range of one or more database objects for each job dependency or other database operation set. In some embodiments, a "live range" of any given database object as described herein refers to the range or interval as defined in in some computer object (e.g., basic blocks or nodes in a directed acyclic graph) that the particular database object is needed for one or more queries or database operation sets (e.g., a set of dependent jobs). Specifically, in some embodiments, the live range may defined by a point (e.g., a basic block or node in a directed acyclic graph) at which a database object is (or needs to be) first accessed (e.g., written to or read from) to another point at which the same database object is (or needs to be) last accessed for a set of database operations (e.g., dependent jobs). In an illustrative example, a graph structure's nodes may represent each job and the job's dependent other jobs that are oriented according to their order of dependency, such as illustrated in FIG. 3. If there are 3 jobs, where the initiation of a third job (node 3) requires a second job (node 2) to complete and the initiation of the second job requires the first job (node 1) to complete, but only the first job and the second job use the a first database object, the live range for the first database object is computed as spanning the first node and the second node corresponding to the first and second jobs because both dependent first job and second job require access to the first table but the third job does not require access to the first table.

Various embodiments of the present disclosure intelligently allocate and/or deallocate memory to database objects based at least in part on a characteristic of the memory and/or the computed live range for the one or more database objects. For example, the characteristic of the memory may include available storage capacity, number of servers in a cluster, memory utilization, and the like. In this way, particular embodiments can, for example, allocate a particular quantity and/or memory location to database objects when that memory is available over or under some threshold. With respect to the live range, some embodiments can allocate and/or deallocate a database object from memory by mapping the live range to a time duration that the database object is kept in a memory location. Examples of allocation and deallocation using live ranges includes using modified linear scan or color graph algorithms, which are described in more detail herein. Although various embodiments and FIGs described herein describe the present technology in terms of "database tables" and "tables," it is understood that any suitable database object can alternatively be used in such embodiments and FIGs.

Turning now to FIG. 1, a schematic diagram is provided showing an example operating environment 100 in which some embodiments of the present disclosure may be employed. It should be understood that this and other arrangements described herein are set forth only as examples. Other arrangements and elements (e.g., machines, interfaces, functions, orders, and groupings of functions) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory.

Among other components not shown, example operating environment 100 includes a number of user devices, such as user device(s) 108, servers 102, servers 104, server 106, and storage 112, each of which are communicatively coupled via the one or more networks 110. It should be understood that environment 100 shown in FIG. 1 is an example of one suitable operating environment. Each of the components shown in FIG. 1 may be implemented via any type of computing device, such as computing device 800 described in connection to FIG. 8, for example. These components may communicate with each other via network(s) 110, which may include, without limitation, one or more local area networks (LANs) and/or wide area networks (WANs). In exemplary implementations, network(s) 110 comprises the Internet and/or a cellular network, amongst any of a variety of possible public and/or private networks. For example, in some embodiments, each of the servers 102, 104, and 106 represent clusters are located in a data center and are connected via a LAN.

It should be understood that any number of user devices, servers, and data sources may be employed within operating environment 100 within the scope of the present disclosure. In some embodiments, the operating environment 100 represents multiple devices cooperating in a distributed environment (e.g., a cloud computing environment). For instance, in some embodiments the environment 100 represents a cluster computing environment where 102 represents a first cluster, with corresponding nodes or hosts 102-1 (e.g., a first computing device), 102-2 (e.g., a second computing device), and where 104 represents a second cluster, with corresponding nodes 104-1, 104-2, and 104-3, and where 106 represents a central or coordinating node or represents another node of another cluster.

Cluster computing environments include one or more clusters where each cluster includes two or more nodes. The nodes or clusters work together by combining their collective resources (e.g., memory, CPU, bandwidth) so that they function as a single unit (e.g., during load balancing, parallel processing, and the like). Clusters are typically deployed in distributed computing system environments (e.g., cloud computing, peer-to-peer, or Storage Area Networks (SAN)). In some embodiments, each cluster or node of the operating environment 100 includes identical or similar hardware and/or operating system components. Alternatively, in some embodiments, each cluster or node of the operating environment 100 represents a heterogeneous network where different computer hardware (e.g., laptops, mobile, desk tops) run various kinds of operating systems but which are still connected via the network(s) 110.

A "central" or "coordinating" node (e.g., a computing device) is responsible for managing or coordinating jobs, operations, and/or other functionality across clusters. For example, the coordinating node can coordinate load balancing, parallel processing, and/or fault tolerance across clusters, schedule jobs that each cluster will perform, or schedule database operations that each cluster will perform, as described herein. Load balancing refers to distributing a set of tasks or jobs over the clusters 104 and 102 to make processing more efficient. For example, the coordinating node can analyze CPU, memory, and/or network utilization and schedule a job to be performed on a cluster that has the least amount of utilization or utilization below a threshold. Parallel processing refers to breaking or segmenting a given task, set of computer instructions, or process into components parts and running each of the component parts in parallel or simultaneously across nodes and/or clusters. For example, in the context of database operation jobs, a coordinating node may break up a query request with job dependencies to read data from 3 tables by having the first cluster 102 handle the request from a first table and having the second luster 104 handle the request from the second table. Fault tolerance refers to the ability of the operating environment 100 (or cluster within the environment 100) to continue operating without interruption when one or more of its components (e.g., node 104-1) fail. For example, node 104-1 may be the only node responsible establishing a connection via a handshake process but may experience a handshake connection fault. Instead of handshaking not occurring, the coordinating node may cause node 104-2 to establish a connection via handshake instead.

In some embodiments, the coordinating node additionally or alternatively manages resources, such as memory, CPU, and the like. In this way, the coordinating node can schedule jobs and the like. As illustrated in FIG. 1, the server 106 includes the memory allocator 106-1. In this way, the coordinating node can generate a configuration file that indicates memory allocation (and/or deallocation) across the clusters 104 and 102, processing speed or capabilities across the clusters 104 and 102, and/or runtime or real-time work utilization (e.g., CPU, memory, network, disk, etc.) to determine how busy each cluster is. To manage resources and perform other functionality across clusters, the central node may store or have access to a data structure that includes identifiers identifying each cluster, as well as additional identifiers identifying each node within the cluster. Additionally or alternatively, one or more resources (e.g., memory, CPU, registers) may include identifiers so that jobs or database objects can be assigned, as described in more detail herein. In some embodiments, the memory allocator 106-1 represents the memory allocation/deallocation determiner 208 as described with respect to FIG. 2.

User device(s) 108 can be client devices on the client-side of operating environment 100, while servers 102, 104, and 106 can be on the server-side of operating environment 100. Servers 102, 104, and 106 can comprise server-side software designed to work in conjunction with client-side software on user device(s) 108 so as to implement any combination of the features and functionalities discussed in the present disclosure. This division of operating environment 100 is provided to illustrate one example of a suitable environment, and there is no requirement for each implementation that any combination of servers 102, 104, 106 and user device(s) 108 remain as separate entities.

User device(s) 108 may comprise any type of computing device capable of use by a user. For example, in one embodiment, user device(s) 108 may be the type of computing device described in relation to FIG. 8 herein. By way of example and not limitation, a user device may be embodied as a personal computer (PC), a laptop computer, a mobile or mobile device, a smartphone, a tablet computer, a smart watch, a wearable computer, a personal digital assistant (PDA), a music player or an MP3 player, a global positioning system (GPS) or device, a video player, a handheld communications device, a gaming device or system, an entertainment system, a vehicle computer system, an embedded system controller, a camera, a remote control, a bar code scanner, a computerized measuring device, an appliance, a consumer electronic device, a workstation, or any combination of these delineated devices, or any other suitable computer device.

Storage 112 may comprise data sources (e.g., databases or data warehouses), and/or data systems, which are configured to make data available to any of the various constituents of operating environment 100, or system 200 described in connection to FIG. 2. Storage 112 may be discrete from user device(s) 108 and servers 102, 104, and 106 or may be incorporated and/or integrated into at least one of those components. In various embodiments, storage 112 includes source and target databases to perform ETL jobs as described herein.

Figure 2:
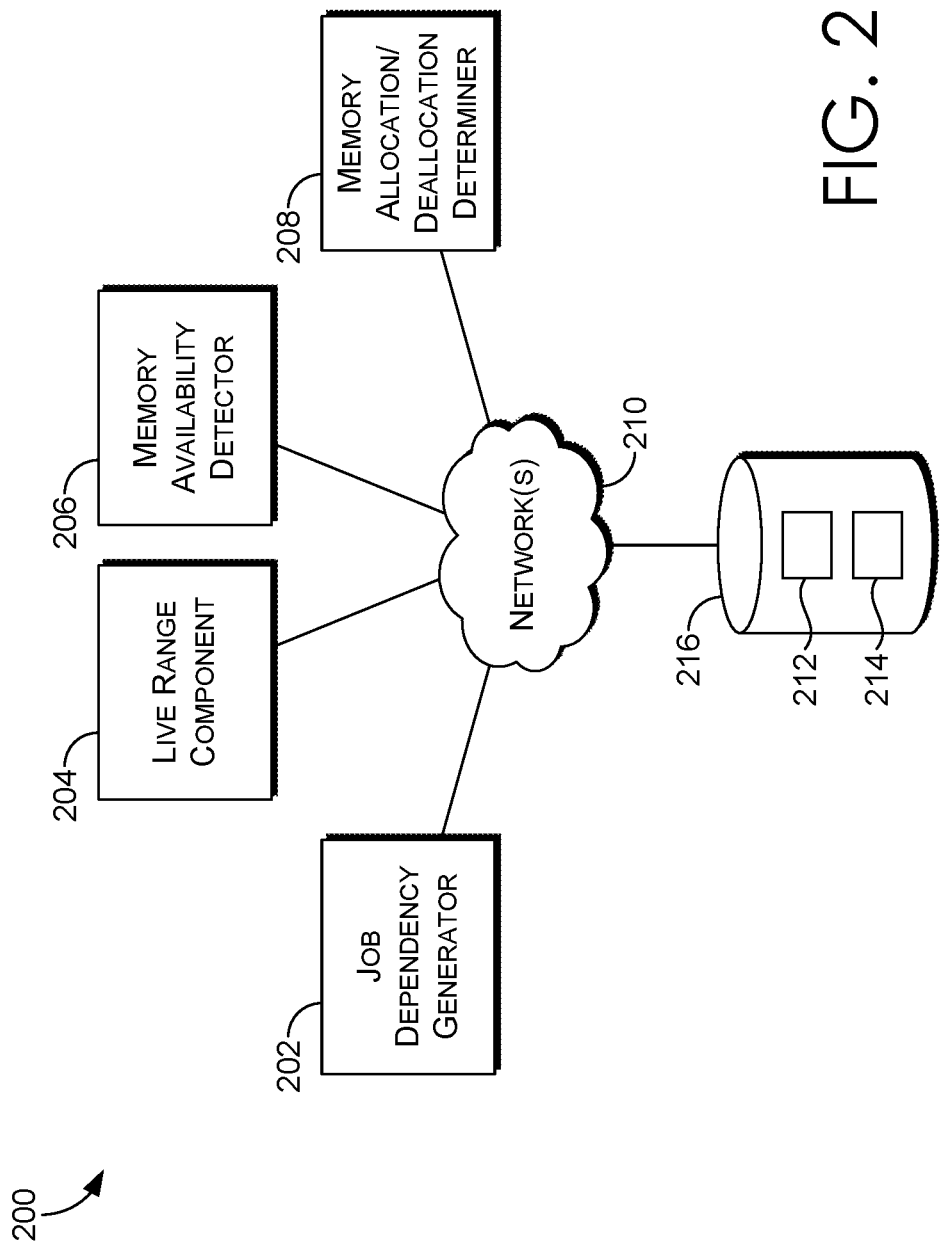
FIG. 2 is a block diagram illustrating an example system architecture in which particular embodiments of the present disclosure may be employed.

Operating environment 100 can be utilized to implement one or more of the components of the system 200, described in FIG. 2. Operating environment 100 also can be utilized for implementing aspects of process flow 500, and/or 600 as described with respect to FIG. 5 and FIG. 6 respectively.

FIG. 2 is a block diagram of an illustrative system architecture 200 in which some embodiments of the present technology may be employed. Although the system 200 is illustrated as including specific component types associated with a particular quantity, it is understood that alternatively or additionally other component types may exist at any particular quantity. In some embodiments, one or more components may also be combined. It is also understood that each component or module can be located on the same or different host computing devices. For example, in some embodiments, some or each of the components within the search engine system 200 are distributed across a cloud computing system, such as the operating environment 100. In other embodiments, the system 200 is located at a single host or computing device, such as the coordinating node 106 of FIG. 1. In some embodiments, the system 200 illustrates executable program code such that all of the illustrated components and data structures are linked in preparation to be executed at run-time.

System 200 is not intended to be limiting and represents only one example of a suitable computing system architecture. Other arrangements and elements can be used in addition to or instead of those shown, and some elements may be omitted altogether for the sake of clarity. Further, many of the elements described herein are functional entities that may be implemented as discrete or distributed components or in conjunction with other components, and in any suitable combination and location. For instance, the functionality of system 200 may be provided via a software as a service (SAAS) model, e.g., a cloud and/or web-based service. In other embodiments, the functionalities of system 100 may be implemented via a client/server architecture.

The system 100 is generally directed to allocating and/or de-allocating one or more database objects (or instances of database objects) to memory to execute one or more database operations. The system 200 includes the job dependency generator 202, the live range component 204, the memory availability detector 206, the memory allocation/ deallocation determiner 208, and storage 216, each of which are communicatively coupled to the network(s) 210. In some embodiments, the network(s) 210 represents or is included in the network(s) 110 of FIG. 1.

The job dependency generator 202 is generally responsible for determining the job dependencies between jobs and generating a dependency object 212 that represents such job dependencies. For example, a user may issue a query that includes job A and job B. job B (a "child" job) may be required to wait for a file output from job A (a "parent" job). In another example, a query can specify a report job that combines the views of three tables. The reading of the needed data within the three individual tables may be considered parent jobs that must be completed first before the report that combines views is generated. The job dependency generator 202 can determine job dependencies via any suitable scheduling system. For example, in some embodiments, the job dependency generator 202 uses UC4, which defines the starting point (e.g., what jobs are at what time). In the UC4 job scheduler, there is a "WaitFor" operator that is used to wait for a particular even like dependent job finished event. Some embodiments use a "done file," which is a touch file that indicates a particular job is finished, thus other successor jobs can detect the "done file" name and once the file appears, the successor jobs can start.

The dependency object 212 is any suitable data structure (e.g., graph, tree, hash table, look-up table, etc.) that maps the relationships of jobs to illustrate job dependencies. For example, in some embodiments the dependency object 212 is a directed acyclic graph or any suitable network graph structure. A network graph is a pictorial representation or visualization for a set of objects where pairs of objects are connected by links or edges. The interconnected objects are represented by points termed "vertices," and the links that connect the vertices are called "edges." Each node or vertex represents a particular position in a one-dimensional, two-dimensional, three-dimensional (or any other dimensions) space. A vertex is a point where one or more edges meet. An edge connects two vertices. In various embodiments, each node can represent a job and each edge or attribute of an edge (e.g., the thickness) can indicate whether jobs are dependents or not, which is described in more detail below.

The live range component 204 is generally responsible for computing a live range of one or more database objects accessed in one or more jobs for a given query. For instances, the live range can be indicative of the span of jobs that require access to table A. As described herein, in some embodiments, a "live range" is indicative of the span or range of individual program instructions (e.g., database operations) or basic blocks that a particular database object is used by. Similar to compiler construction, a "basic block" as described herein refers to a code sequence (e.g., a "straight-line" code sequence) with no branches in except to the entry and no branches out except at the exit. This means that there is typically one entry point, meaning no code within it is the destination of a jump instruction anywhere in the program. Basic blocks typically include only one exit point, meaning only the last instruction can cause a program to beginning executing code in a different block. Put another way, a basic block is a set of statements or instructions that execute serially in order one after another in a sequence. In various embodiments, each job or node in the network graph or other object within the job dependency object 212 represents a basic block in a program. Accordingly, for example, the live range of a table can be the span of jobs, which are dependent job and are represented as basic blocks that use the table.

In an illustrative example of live range, the live range for table A may begin at a basic block representing job 1 where table A is first accessed or used (read from/written to) and end at another basic block representing job 5 where table A is accessed or used dependent on the first job completing.

The memory availability detector 206 is generally responsible for detecting memory and/or other resources (e.g., CPU registers) that are available to run one or more jobs of a query. For example, within a cluster computing environment as illustrated in aspects of the operating environment 100, the memory availability detector 206 detects which cluster 102 or 104 is available to run one or more jobs. In an illustrative example, the coordinating node 106 may receive one or more queries from the user device 108, which is indicative of requesting data that requires multiple jobs or database operations to be executed. Responsively, the coordinating node 106 determines which of the clusters 102 or 104 are available to execute the query and corresponding jobs. The clusters 102 and 104 are any clusters described herein are also referred to as "cluster caches." A "cluster cache" or cache cluster is a set of interconnected server nodes (e.g., node 102-1 and node 102-2) that form a cluster (e.g., 102) of servers which behave as a single cache unit. With additions of more server nodes in a cluster cache, more storage space and higher availability of cached data can be gained for large applications or robust jobs. In this way, the memory availability detector 206 can determine which cluster caches are available to run a particular job of the query and/or other related jobs. A cluster cache may be any mechanism that uses faster storage or memory relative to disk I/O or "se/der" (i.e., serialization/deserialization) processes. In HADOOP, for example, hdfs has the capability of centralized cache control to move data from/to cache.

In some embodiments, the available memory or other resource that the memory availability detector 206 detects need not be at the cluster cache level or cache in general, but any memory at the host level that is not disk (e.g., RAM, flash memory). For example, in some embodiments, the memory availability detector 206 detects a particular level of cache (e.g., L1, L2, and/or L3) or Random Access Memory (RAM) that is available to run a job.

The memory availability detector 206 can determine whether memory or other resources have availability to run one or more jobs in any suitable manner. For example, the memory availability detector 206 can send, via an application programming interface (API), a request to the coordinating node 106 to obtain a configuration file that includes memory and/or other resource attributes. For example, the configuration file can include various attributes at the cluster cache level or individual host level. For instance, the configuration file can include CPU speed (e.g., clock speed or number of cycles CPU executes per second), size of memory capacity or availability (e.g., in MegaBytes), CPU utilized (e.g., in terms of percentage of CPU currently being used), memory utilized (e.g., in terms of percentage or MegaBytes currently in use), network utilized (e.g., in terms of megabits per second currently in use), and the like. In some embodiments, the coordinating node 106 stores this configuration file and passes it, via the API, to the memory availability detector 206.

In some embodiments, the cluster caches or any other memory determined by the memory availability detector 206 is analogous to a register file. A "register file" is an array of processor registers or storage cells. A register file is the highest level of the memory hierarchy. The register file is a concept of logical programmable registers in CPU/GPU that provide cycles (ns) level performance compared to main memory (e.g., disk), which may be ms level performance. For example, on X86/amd64, there are a fixed number of general purpose registers typically named as EAX/EBX etc., or special purpose programmable registers like xmm or ymm, and the like. Similarly, in some embodiments, the cluster cache or memory detected by the memory availability detector 206 and/or used by the memory allocation/deallocation determiner 208 is computationally fast in terms of throughput (e.g., 2 to 3 times faster relative to disk), the cluster caches or memory is programmable (e.g., the memory allocation/deallocation determiner 208 can allocate/deallocate objects or other instances to portions of the cluster caches or memory), and/or the cluster caches or memory is small or has low storage capacity relative to disk or other memories. In some instances, because there is low storage capacity, it is easy for jobs or tables associated with jobs to be swept into and out of memory. Accordingly, embodiments of the presents disclosure explicitly allow the association/deallocation of tables, as described herein.

The memory allocation/deallocation determiner 208 is generally responsible for allocating memory and/or deallocating memory and/or other resources for one or more database objects (or instances (e.g., columns, rows, and/or fields) of tables) that are a part of one or more jobs to be executed in response to a query. "Allocating" memory may refer to assigning a cluster cache identifier or memory address (e.g., cache or RAM address) to a database object such that the database object is accessible at the corresponding cache identifier or memory address. Such assignment may include, for example, assigning a pointer, handle, or other reference value to a table in memory so that it can be accessed (e.g., read/write) in a specific memory location. "Deallocating" memory may refer to deleting the allocation, spilling the allocation to another memory source, and/or otherwise removing the allocation to the specific cluster cache or memory. For example, deallocating can include deleting the pointer, handle, or other reference value in the cluster cache or memory such that the reference is no longer used to access the table in the corresponding cluster cache or memory. Continuing with this example, deallocating additionally or alternatively can include spilling or generating another reference to the table in a lower hierarchical memory or cluster cache.

In some embodiments, the memory allocation/deallocation determiner 208 performs its functionality based on the live range computed via the live range component 208 and/or the memory/resources available as determined by the memory availability detector 206. For example, in some embodiments, the memory allocation/deallocation determiner 208 allocates a particular table to a particular cluster cache or other memory depending at least in part on the live range of the table. For example, if a first table is read at job 1, written to at job 2, which is dependent on job 1 to be completed, and then accessed again at job 2, which is dependent on job 2 to be completed, the memory allocation/deallocation determiner 208 may determine that the live range spans 3 jobs, which is indicative of the first table being needed for a longer duration of time. Accordingly, for example, the memory allocation/deallocation determiner 208 may assign the first table to a first cluster cache for a particular duration of time that matches or is otherwise appropriate to complete each job that needs the first table.

In another example, the memory allocation/deallocation determiner 208 can determine an optimal cluster cache, memory, or other resource based on available resources detected by the memory availability detector 206. For example, if a particular set of CPUs had a certain clock speed, memory had a particular storage capacity, the CPU was utilized below a threshold, cluster cache being utilized below a threshold, memory was utilized below a threshold, and/or the like as illustrated in a configuration file, the memory allocation/deallocation determiner 208 can select the particular cluster cache, memory, or other resource to assign the corresponding table to so that the resource can execute one or more jobs needing that table without a relative amount of computing overhead (e.g., there is optimal throughput, optimal network bandwidth, memory capacity, etc.).

In some embodiments, the memory allocation/deallocation determiner 208 alternatively or additionally performs its functionality based at least in part on determining one or more "critical" paths or jobs. A "critical" path or job refers to a job that will likely use one or more resources over a threshold (e.g., in terms of memory or CPU utilization) and/or refers to multiple jobs that together, when executed, will likely use one or more resources over a threshold. For example, a single job may include 80 dependent jobs or sub-jobs that require terabytes of data to be read from multiple database objects. In another example, a job may require views to be merged from thousands of database objects. In such situations, it may be useful for the memory allocation/deallocation determiner 208 to perform its functionality. The memory allocation/deallocation determiner 208 can determine whether a job is critical in any suitable manner. For example, if a query includes jobs that are over a count or quantity threshold (e.g., the query contains 20 jobs), then the allocation/deallocation determiner 208 can tag each job as critical. Alternatively or additionally, if a particular job is part of other dependent jobs over a count or quantity threshold (e.g., there are 4 other dependent jobs), then the particular job and other dependent jobs can be tagged as critical. Alternatively or additionally, if one or more jobs require database objects that include data values over a particular memory storage capacity threshold, then the one or more jobs are critical. Alternatively or additionally, if one or more database objects are over a row count threshold (e.g., 30 rows), column count threshold (e.g., 30 columns), table count threshold (e.g., 50 tables) and/or word or string threshold, then the one or more jobs can be deemed to be critical.

In some embodiments, the memory allocation/deallocation determiner 208 determines or tags a particular job or job set (e.g., a job with its dependents) as "not critical" meaning that some threshold has not been met (e.g., memory consumption, job count threshold, database object attribute threshold, etc.). In some embodiments when non-critically is determined, the memory allocation/deallocation determiner 208 selectively refrains from or does not allocate the corresponding database object(s) to cluster cache, memory, or other resources. For example, the memory allocation/deallocation determiner 208 may determine that a job has no dependent jobs and/or the tables referenced in the job would not require processing over a threshold. Accordingly, responsive to tagging the job as not critical, the memory allocation/deallocation determiner 208 would not allocate and/or deallocate the corresponding table(s) used by the job. In this way, for example, the memory allocation/deallocation component 208 can allocate certain database objects used for certain jobs to particular memory locations while also refraining from allocating other database objects of jobs (e.g., the same jobs).

The memory allocation/deallocation determiner 208 may use any suitable algorithm to assign particular database objects to particular cluster caches, memory, or other resources. For example, a modified version of a linear scan register allocation algorithm or a color graph algorithm can be used. These algorithms are described in more detail below.

In some embodiments, the output of the memory allocation/deallocation determiner 208 is a set of instructions encoded in a file that dictates where and/or when database objects (or instances thereof) are allocated and/or deallocated. For example, at time t1 (start time) (e.g., 2 p.m.), the memory allocation/deallocation determiner 208 may allocate 2 GB of memory from cluster 1 to Table A for 2 hours (e.g., 4 p.m.) (end time). At time t2 (e.g., 4 p.m.) the memory allocation/deallocation determiner 208 may allocate 4 GB of memory to table B for 4 hours (e.g., until 7 p.m.). At time t3 (e.g., 7 p.m.), the allocation/deallocation determiner 208 may spill table A from cluster 1 to disk. This provides the advantages and improvements as described herein. For example, this ensures that tables required by particular database operations are not arbitrarily swept into and out of memory so that computing performance is improved, such as with respect to I/O as described herein.

Example system 100 also includes storage 216. Storage 216 generally stores information including data, computer instructions (e.g., software program instructions, routines, or services), data structures, and/or models used in embodiments of the technologies described herein. By way of example and not limitation, data included in storage 216, as well as any user data, may generally be referred to throughout as data. Some embodiments of storage 216 may have stored thereon computer logic comprising the rules, conditions, associations, classification models, and other criteria to execute the functionality of any of the components, modules, analyzers, generators, and/or engines of systems 200. For example, storage 216 includes the job dependency object 212 and one or more database objects 214 of one or more databases.

In some embodiments, although not shown, the system 200 also includes a presentation component that is generally responsible for causing presentation of content and related information to user devices (e.g., the user device(s) 108), such as indications of memory allocation and/or deallocation as performed by the memory allocation/deallocation determiner 208. The presentation component may comprise one or more applications or services on a user device, across multiple user devices, or in the cloud. For example, in one embodiment, presentation the component manages the presentation of content to a user across multiple user devices associated with that user. Based on content logic, device features, associated logical hubs, inferred logical location of the user, and/or other user data, presentation component may determine on which user device(s) content is presented, as well as the context of the presentation, such as how (or in what format and how much content, which can be dependent on the user device or context) it is presented and/or when it is presented.

In some embodiments, the presentation component generates user interface features. Such features can include interface elements (such as graphics buttons, sliders, menus, audio prompts, alerts, alarms, vibrations, pop-up windows, notification-bar or status-bar items, in-app notifications, or other similar features for interfacing with a user), queries, and prompts. In some embodiments, the presentation component 112 generates structured data, tagged data or otherwise causes presentation of structured or tagged data that was previously unstructured, semi-structured, or untagged. For example, in some embodiments the presentation component in some embodiments causes display of the time of allocation of a table, the amount of memory allocated for the table, the time of deallocation of the table, and the like, which may have been previously unstructured or otherwise been in a different form (e.g., existed only as a listing) than the output provided by the presentation component. In this way, some embodiments convert input data to an output that is different than the input.

FIG. 3 is a block diagram of an acyclic directed graph (DAG) 300 illustrating job dependencies and database tables needed to complete each job, according to some embodiments. In some embodiments, the DAG 300 represents the job dependency object 212 and that is used by the job dependency generator 202, as described with respect to FIG. 2. In some embodiments, the DAG 300 and all of the functionality described with respect to FIG. 3 represents the functionality used by the live range component 204 to determine what the live range for a given table is.

The DAG 300 includes various nodes and edges, which illustrate the relationship between the jobs. Specifically the edges represent the dependency relationship between the jobs. For example, node 302 (job 0) is connected to node 304 (job 2) via the edge 312, indicating that beginning job 2 depends on some state of job 0, such as job 0 completing. Likewise, node 304 is connected to node 306 (job 6) via the edge 314, indicating that beginning job 6 depends on some state of job 2 (e.g., job 2 completing some sub-task). Likewise, node 306 is connected to node 308 (job 8) via the edge 316, indicating that beginning job 8 depends on some state of job 6 (e.g., job 6 finishing all of its sub-tasks) Likewise, node 308 is connected to node 310 (job 9) via the edge 318, indicating that the beginning of job 9 depends of some state of job 8 being met.

The DAG 300 also illustrates the live range for a given table. Each of the "t" markings (e.g., "t1") in FIG. 3 represent tables (or instances of tables) that each job or database operation(s) must access (e.g., read from and/or write to) to complete its corresponding job. For example, job 0 must access t1, t2, t3, and 44 (i.e., database table 1, database table 2, database table 3, and database table 4) before job 0 is complete. As described herein, in some embodiments each node in a DAG represents a "basic block" or point reference in a program to compute a live range. For example, the live range of table 1 spans from basic block node 302 (job 0) to basic block node 310 (job 9). These are the two end points or range boundary jobs that define the job dependency group. All of the other related jobs that contain table 1 are also part of the live range—i.e., job 2, job 6, and job 8. In another example, the live range of table 2 only spans from node 302 (job 0) to node 308 (job 8) because the last dependency job 9 does not use table 2.

In some embodiments, the live range may alternatively refer to the beginning or first basic block that uses a particular table and the last basic block that uses the particular table even if not all of the basic blocks in between these beginning and ending basic blocks do not access the same table. In some instances, certain dependent jobs "skip" or otherwise do not include the same tables but then later downstream jobs use the table. In these instances and in some embodiments, there is no break or cutoff in live range computation but it can still be the first basic block and end basic block used in a job dependency set (e.g., job 0, job 2, job 6, job 8, and job 9). For example using the DAG 300 as an illustration, the live range of table 6 in some embodiments spans from job 6 to job 9 (the beginning and end basic blocks) even though it is not used in the intermediate job 8, which is in between job 6 and job 9.

Some embodiments (e.g., the memory allocation/deallocation determiner 208) can associate or map, via a data structure (e.g., a lookup table), each basic block count (representing a live range) to a time interval that specifies when (and/or how long) to allocate and/or deallocate tables to cluster cache, memory, or other resources. For example, the memory allocation/deallocation determiner 208 can keep a table in memory for 30 minutes for each basic block span. Using this example, table 1 is kept in a specific cluster cache or memory for 2 and a half hours because it spans a count of 5 basic blocks. The memory allocation/deallocation determiner 208, for example, can read a lookup table or other structure that lists each basic block count (or other live range interval) to a time interval that a program should keep a given table in memory for. For instance using the example above, a basic block count of 4 can be mapped to 2 and a half hours (any table should be kept in any given memory or resource for 2 and a half hours). A basic block count of 1 can be mapped to 20 minutes, etc.

In some embodiments, the live range or relationship between jobs is additionally or alternatively determined based on using distance in network graphs. In some embodiments, a "distance" in terms of network graphs corresponds to a number of edges (or edge sets) in a shortest path between vertex U and vertex V. In some embodiments, if there are multiple paths connecting two vertices, then the shortest path is considered as the distance between two vertices. Accordingly, distance can be defined as d(U,V). For example, the distance between node 302 (job 0) and node 310 (job 9) is 4 because there are 4 edges between them representing the shortest path. Accordingly, once it is determined that there is a job dependency for job 0, job 2, job 6, job 8, and job 9 and all of those jobs use table 1 as illustrated, the live range can be computed as 4 or spanning a distance of 4 between jobs. Some embodiments (e.g., the memory allocation/deallocation determiner 208) can likewise associate or map, via a data structure (e.g., a hash map) each distance to a time interval that specific when and/or how long to allocate and/or deallocate tables to cluster cache, memory, or other resources. For example, a hash map may list all distances and each time interval that each table should be kept in memory or otherwise occupied by a resource. For example, if there 4 edges, between each node in a job dependency set (as illustrated by job 0, job 2, job 6, job 8, and job 9), then the mapping can list 2 and a half hours.

In some embodiments, the DAG 300 additionally illustrates a "critical path" as described herein. In some embodiments a "job dependency" or "job dependency group" or "job dependency set" (e.g., job 0, job 2, job 6, job 8, and job 9) is at least partially defined by whether or not each dependent job is "critical." For example, even though the DAG 300 illustrates that the initiation of job 6 is dependent on some state being met for jobs 3 and 6 (not just job 2 as described above), in some embodiments jobs 3 and 6 are removed from consideration from computing a live range because it is not a "critical" job. For instance, job 3 and job 4 may only have to access a single table or a quantity of tables under some count threshold (e.g., and/or memory consumption (e.g., byte) threshold). In these instances, only job 2 is considered when calculating a live range for a given table, as illustrated in FIG. 3.

Alternatively or additionally, each basic block level is analyzed to determine a "critical" path or live range. A basic block "level" refers to the horizontal (not vertical) position of a node within the DAG 300. For example, the DAG 300 illustrates that there are 5 basic block levels. Job 0 is at the first level because it is oriented furthest to the left. Each of jobs 1, 2, 3, and 4 are at the second level because they are vertically stacked but in the same horizontal position and are to the right of job 0. Jobs 5 and 6 are at the third level because they are in the same horizontal position to the left of jobs 1, 2, 3, and 4. Jobs 7 and 8 are at the fourth level because they are in the same horizontal position to the left of jobs 5 and 6. Job 9 is at the fifth level because it is the last node to the left of jobs 7 and 8. Accordingly, for example, as long as one job at a given level contains a particular table, then the live range includes the corresponding basic block even if some jobs in a job dependency set do not include the particular table. For example, referring to FIG. 3, even if none of the other jobs at the second level (i.e., job 1, job 3, and job 4) need to access table 2, the live range for table 2 still extends to the second level because job 2 requires access to table 2.

Figure 4:
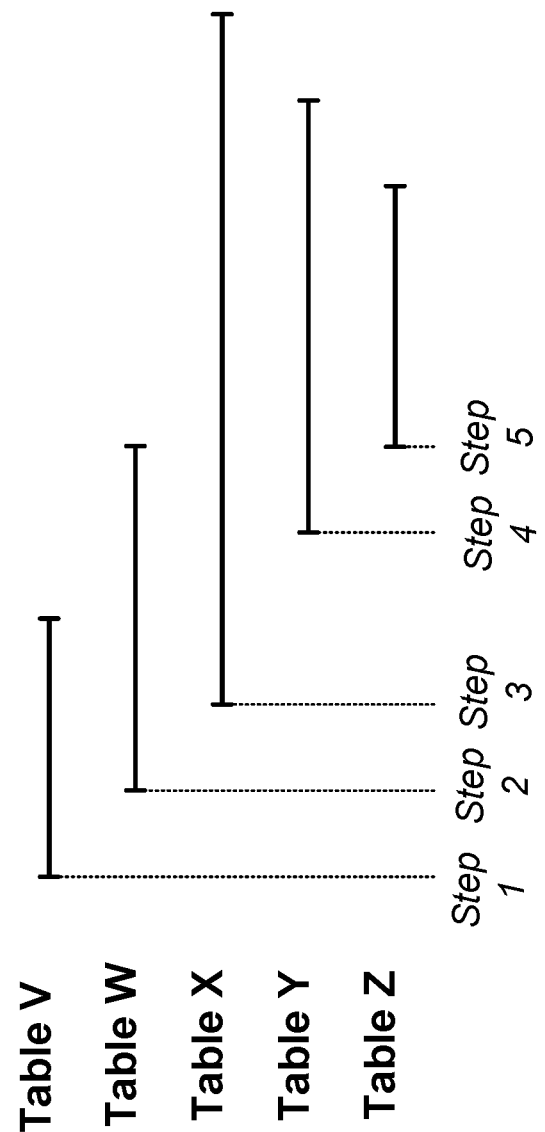
FIG. 4 is a schematic diagram illustrating how database objects, such as tables, are allocated and/or deallocated using a variation of a linear scan algorithm, according to particular embodiments.

FIG. 4 is a schematic diagram illustrating how database tables are allocated and/or deallocated using a variation of a linear scan algorithm, according to some embodiments. In some embodiments, FIG. 4 represents at least a portion of the functionality performed by the memory allocation/deallocation determiner 208 as described with respect to FIG. 2.

The linear scan algorithm allocates processor registers to program variables. A variable is a name given to a computer memory location and are used to store values in a computer program. However, various embodiments described herein do not use the original scan linear algorithms because these embodiments do not allocate registers to variables, but rather use a variation of the linear scan algorithm by allocating cluster caches or other non-register memory location to database tables instead of variables, which is an unexpected use for the linear scan algorithm. According to various embodiments, the linear scan algorithm variation scans all live ranges of each table (e.g., in each dependent job) in a single pass given the live ranges of database tables in a job dependency object (e.g., the DAG 300 of FIG. 3), and allocates database tables in a greedy fashion. For example, referring back to FIG. 3, some embodiments can scan or determine the live ranges for each of the tables for each of the job illustrated in FIG. 3 in a single pass and then allocate each of the database tables in a greedy manner, as described in more detail below.

A linear scan algorithm uses a "live interval." Given some numbering of the intermediate representation, [i,j] is said to be a live interval for database table t if there is no instruction with number j'>j such that t is live at j', and there is no instruction with number i'<i such that t is live at i'. This information represents an approximation of live ranges. In some embodiments there may be subranges of [i,j] in which t is not live, but they are ignored. A database object is "live" when it needs to be accessed by a job. A database object is not live if it does not need to be accessed by a job. For example, referring back to FIG. 3, table 6 is live at job 6 but it is not live at job 8 (because it is not accessed at job 8) but then it is live again at subsequent and dependent job 9. Accordingly, the live range or live interval can still be job 6 through job 8. In various embodiments, the live interval for any database object t is [1, N], where N is the number of pseudo-instructions in the intermediate representation (e.g., number of nodes or basic blocks in the graph 300 that must access table t).

Given live table information (obtained, for example, via the DAG 300), live intervals can be computed easily with one pass through the intermediate representation. Interference among live intervals is captured by whether or not they overlap. Given C available cluster caches or other non-register memory and a list of live intervals of each table in a job dependency set, the varied linear scan algorithm may allocate cluster caches or other non-register memory to as many intervals (or intervals of tables) as possible, but such that no two (or other threshold quantity) overlapping live intervals (or tables with overlapping live intervals) are allocated to the same cluster cache or non-register memory. If n>C live intervals overlap at any point (e.g., node, level, or basic block), then at least n−C of them must reside or be spilled into another cluster cache or non-register memory. For example, referring back to FIG. 3, because both tables 1 and tables 2 overlap live ranges until the end of job 8, one of the tables may be spilled to another memory location.

In some embodiments, the number of overlapping intervals changes only at the start and end points of an interval (e.g., job 0 and job 9 of FIG. 3). In some embodiments, live intervals are stored in a list that is sorted in order of increasing start point (e.g., as illustrated in FIG. 4). Hence, the algorithm can quickly scan forward through the live intervals by skipping from one start point or basic block to the next.

In some embodiments, the linear scan variation algorithm is represented by the following pseudocode sequence:
LinearScanClusterCacheAllocation

```
active ← { }
foreach live interval i, in order of increasing start point
    EXPIREOLDINTERVALS(i)
    if length(active) = R then
        SPILLATINTERVAL(i)
    else
        cluster cache[i] ← a cluster cache removed
        from set of free cluster caches
            add i to active, sorted by increasing end point
```

ExpireOldIntervals(i)

```
foreach interval j in active, in order of increasing end point
    if endpoint[j] ≥ startpoint[i] then
        return
    remove j from active
    add [j] to set of free cluster caches (e.g., as
    determined by the memory availability detector 206)
```

SpillAtInterval(i)

```
spill ← last interval in active
if endpoint[spill] > endpoint[i] then
    cluster cache[i] ← cluster cache[spill]
    location[spill] ← new stack location
    remove spill from active
    add i to active, sorted by increasing end point
else
    location[i] ← new stack location
```

It is understood that although this pseudocode sequence includes memory elements representing cluster caches, in alternative embodiments, the memory elements may refer to any non-register or non-disk storage, such as main memory or cache. In some embodiments as illustrated in the pseudo-code sequence above, at each step, the algorithm maintains a list, active, of live intervals that overlap the current point and have been placed in cluster caches. The active list is kept sorted in order of increasing end point. For each new interval, the algorithm scans active from beginning to end. It removes any "expired" intervals—those intervals that no longer overlap the new interval because their end point precedes the new interval's start point—and makes the corresponding register available for allocation. Since active is sorted by increasing end point, the scan needs to touch exactly those elements that need to be removed, plus at most one: it can halt as soon as it reaches the end of active (in which case active remains empty) or encounters an interval whose end point follows the new interval's start point.

Given this information as background, referring back to FIG. 4. FIG. 4 illustrates a set of live intervals denoted by the horizontal lines and corresponding tables. The indicia on the left (i.e., table V, table W, table, X, table Y, and table Z) represents database table names. The corresponding live intervals marked by horizontal lines appear to the right. The numbers in italics refer to steps in the linear scan algorithm described herein.

Consider, for example, the live intervals in FIG. 4, the case when the number of available cluster caches is C=2. The algorithm performs allocation decisions 5 times, once per live interval, as denoted by the italicized numbers at the bottom of the figure. By the end of step 2, active=(table V, table W) and both table V and table W are therefore in cluster caches. At step 3, three live intervals overlap, so one table must be spilled. The algorithm therefore spills table X, the one whose interval ends furthest away from the current point, and does not change active. As a result, at step 4, table V is expired from active, making a register available for table Y, and at step 5, table W is expired, making a cluster cache available for table Z. Thus, in the end, table X is the only table not allocated to a cluster cache. Had the algorithm not spilled the longest interval, table X, at step 3, both one of tables v and W and one of tables Y and Z would have been spilled to another cluster cache or other non-register memory.

It is understood that this varied linear scan algorithm need not be used for cluster cache or memory allocation and/or deallocation. Some embodiments use other algorithms, such as a varied color graph algorithm. In this algorithm, a graph network is generated with nodes and edges where the nodes in the graph represent live ranges of tables that are candidates for cluster cache or memory allocation. Edges connect the database objects that interfere (i.e., tables that are simultaneously live in at least one program point (e.g., a basic block)). Cluster cache or memory allocation then reduces to the graph coloring problem in which colors (i.e., cluster caches or other non-register memory) are assigned to the nodes such that two nodes connected by an edge do not receive the same color. If the graph is not colorable, some nodes are deleted from the graph until the reduced graph becomes colorable. The deleted nodes are said to be spilled because that are not assigned to cluster caches or other non-register memory. The goal of cluster cache or memory allocation by graph coloring is to find a legal coloring after deleting the minimum number of nodes (i.e., after deleting a set of nodes with minimum spill cost).

A coloring of a graph is an assignment of colors to nodes, such that nodes connected by an edge have different colors (e.g., red, blue, and green). A graph is k-colorable if it has a coloring with K colors. Accordingly, some embodiments assign colors (cluster caches or other non-register memory) to graph nodes. K is the number or quantity of cluster caches or other non-register memory units. To compute the coloring of a graph, various embodiments select a first node with fewer than K neighboring nodes. Responsively, some embodiments place the first node on a stack and remove it from the graph. Responsively, some embodiments repeat this action until the graph has one node. Responsively, some embodiments assign colors to nodes on the stack (starting with the last node added). Particular embodiments select a color different from those already assigned colors at each step.

Figure 5:
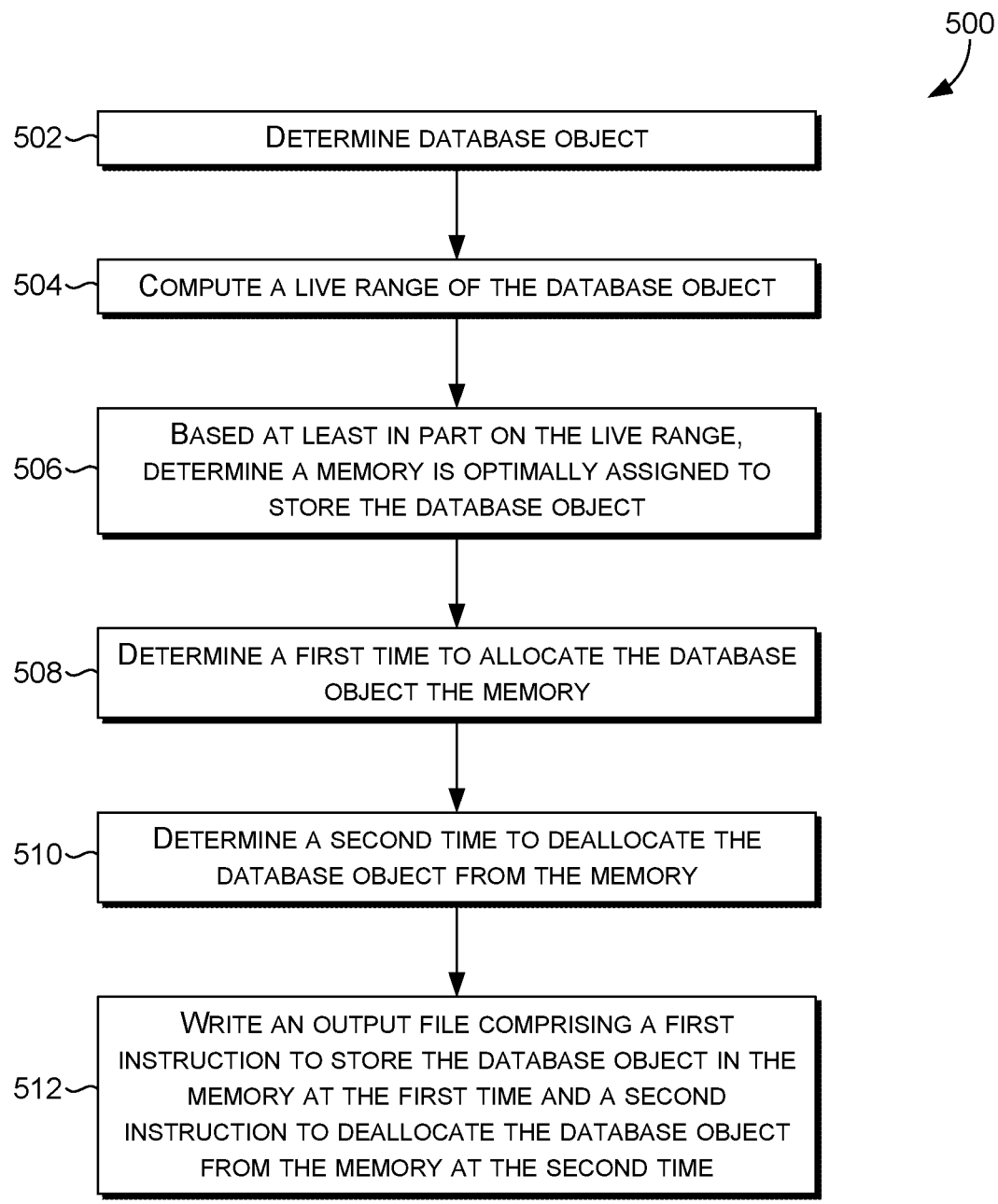
FIG. 5 is a flow diagram of an example process or allocating and deallocating a database object (e.g., a table) to memory, according to particular embodiments.

FIG. 5 is a flow diagram of an example process 500 for allocating and deallocating a database object to memory, according to some embodiments. The process 500 (and/or any operation described herein) may be performed by processing logic that comprises hardware (e.g., circuitry, dedicated logic, programmable logic, microcode, etc.), software (e.g., instructions run on a processor to perform hardware simulation), firmware, or a combination thereof. Although particular blocks described in this disclosure are referenced in a particular order at a particular quantity, it is understood that any block may occur substantially parallel with or before or after any other block. Further, more (or fewer) blocks may exist than illustrated. Such added blocks may include blocks that embody any functionality described herein. The computer-implemented method, the computerized system (that includes computer storage memory and one or more processors), and/or the computer storage media as described herein may perform or be caused to perform the processes 500 and/or any other functionality described herein.

Per block 502, a database object is determined. In some embodiments, the database object is used in a plurality of database operations (e.g., an UPDATE to the database in a first job and a READ from the database object in a second job). In some embodiments, the plurality of database operations can be a part of different jobs as described herein. In some embodiments, the plurality of database operations can be a part of the same job. In some embodiments, the plurality of database operations can occur in response to a single query or in response to multiple queries. In an illustrative example of block 502, the job dependency generator 202 or other component (e.g., UC4) as described with respect to FIG. 2 can determine that multiple queries of multiple jobs request one or more database operations to be performed and reference the database object.

In some embodiments, the memory and database operations described with respect to the process 500 are stored in a cloud. A "cloud" as described herein refers to a cloud computing environment that includes network-based, distributed/data processing system that provides one or more cloud computing services. Further, a cloud computing environment can include many computers, hundreds or thousands of them or more, disposed within one or more data centers and configured to share resources over a computer network. For example, the computer network and environment can be the network 110 of the operating environment 100 of FIG in some embodiments.

In some embodiments, the database operations are a part of an Extract, Transform, and Load (ETL) database job. As described herein, ETL jobs copy data from a source database and write the copied data to a target data store or warehouse in a suitable format. Specifically, for the "Extract" operation (a first database operation), data (e.g., raw data) is extracted or read from one or data sources (e.g., different types of databases). For the "Transform" operation (a second database operation), the read data is converted from its previous form (e.g., raw form) into the form it needs to be in so that it can be placed in another database. Transform occurs by using lookup tables, one or more rules, or combining the read data with other data. In an illustrative example of the Transform operation, several database objects can be joined. In another example, the Transform operation can additionally or alternatively clean, sort, validate, and/or prepare the read data. For the "Load" operation, the transformed data from the "Transform" operation is then written into a target data store. For example, the transformed data can be loaded into a data warehouse to keep it for future analysis (e.g., analyzing BIG data or data mining) and tracking trends.

Per block 504, a live range of the database object is computed. In some embodiments, this includes determining occurrences of the database operations to the database object, such as described with respect to the live range component 204 of FIG. 4 and the DAG 300 of FIG. 3. For example, particular embodiments can determine the range or interval of database operations that require access to the database object, such as determining that there needs to be a read from the database object for a first query as indicated in a computer object and that there needs to be a write to the database object for a second query as indicated in the computer object. The computer object (e.g., the DAG 300) may indicate that the query is (or will) issued second in time after the first query or that the second database operation will be performed subsequent to the first database operation so that the "range" or "interval" of a live range can be computed, as described herein. In another illustrative example, a directed acyclic graph may indicate dependent jobs need access to the same table, as illustrated in FIG. 3.

Per block 506, based at least in part on the live range, particular embodiments determine a memory is optimally assigned to store the database object. Such "memory" refers to a cluster cache, non-disk, or non-register memory, such as main memory (e.g., RAM), cache (L1, L2, or L3) or other memory that is directly accessed by the CPU. For example, memory can refer to main memory or cache but not secondary memory (e.g., hard drives, solid state drives, and/or any removable storage media, such as USB and disk memory). In another example, the memory can be located in a cluster of servers (e.g., the cluster 104 of FIG. 1). In various embodiments, the cluster itself acts as cache or memory such that tables can be allocated to memory at the cluster level (i.e., an individual cluster ID), as opposed to a particular host or node level (e.g., certain memory within a single computer). In some embodiments, it is determined whether a memory is optimally assigned to store one or more portions (e.g., columns, rows, fields) of a database object instead of the entire database object itself. For example, if the set of database operations indicated at block 502 only requested portions of a database record of the database object, then only that portion would need to be stored in memory in some embodiments.

In in illustrative example of block 506, particular embodiments (e.g., the memory availability detector 206) can determine that the database object requires a particular memory consumption requirement (e.g., 4 GB) of data based on all of the data stored in the columns and rows and so embodiments can locate memory that is available to meet the consumption requirement of the database object. Additionally or alternatively, particular embodiments can determine memory consumption requirements for other database objects that are part of the same job, dependent jobs, and/or query as the current database object and responsively locate the available memory to meet the memory consumption requirements. For example, referring back to FIG. 3, embodiments determine the memory consumption requirements of job 0, or table 1, table 2, table 3, and table 4 and find a memory available to store these tables.

In some embodiments, the determining of the memory is optimally assigned to store the database object operation of block 506 is further based on at least one characteristic of the memory. For example, the characteristic can be any one of server memory in a cluster, number of servers (or nodes) in a cluster, or storage availability within a cluster. Other examples of at least one characteristic are described with respect to the memory availability detector 206 of FIG. 2, such as actual memory utilization, CPU utilization, memory capacity, network utilization, or any characteristic written to a configuration file. In some embodiments, the characteristic of the memory is stored in associated with an identifier of the memory. For example, a data structure (e.g., a hash table or lookup table) may identifier the cluster cache 104 with an identifier that identifies the cluster cache 104 and maps the cluster cache 104 to one or more characteristics as described above, such as memory available, memory utilized, network utilized, CPU utilized, and/or the like.

In an illustrative example of block 506, embodiments can determine table consumption requirements for all tables of all dependent jobs (determined by computing the live range of a table) and additionally determine current memory consumption of cluster caches, as well as memory availability of all cluster caches. Responsively, embodiments can identify a memory that is both able to meet the table consumption requirements of all dependent jobs and is available to run the jobs because its memory consumption is not over a threshold and its memory availability can meet the jobs' requirements.

Per block 508, particular embodiments determine a first time to allocate the database object to the memory. In some embodiments, the first time is determined using a variation of a linear scan algorithm, such as described with respect to FIG. 4. For example, based on determining the live range of each database object needing to be accessed for jobs 0, 3, 6, 8, 9, determining how many live ranges intervals overlap for each table, and the like as described with respect to FIG. 4, embodiments can allocate the database object to the memory for 2 hours. In other embodiments, the first time is determined using a color graph algorithm, as described herein. In another example, particular embodiments can map, via a data structure, each basic block, node or other object needing access to the database object to a time representing how much time the database object is needs to be allocated in memory. Examples of block 508 are described with respect to the memory allocation/deallocation determiner 208. As described above, in some embodiments, the entire database object is not allocated to the memory but only portions of the database object that were requested to be accessed by the database operations indicated at block 502.

Per block 510, a second time to deallocate the database object from the memory is determined. In some embodiments, this determination is also based on determining a live range and/or applying the variation of the linear scan algorithm described at block 508. For example, the second time can be based on the time that another database object of the same job (or other pending job) is allocated to another memory (or the same memory). In another example, particular embodiments can map, via a data structure, each basic block, node or other object needing access to the database object to a time representing when the database object is needs to be deallocated in the memory. Examples of block 10 are described with respect to the memory allocation/deallocation determiner 208. As described above, in some embodiments, the entire database object is not deallocated to the memory but only portions of the database object that were requested to be accessed by the database operations indicated at block 502.

Per block 512, particular embodiments write an output file comprise a first instruction to store the database object in the memory at the first time and a second instruction to deallocate the database object from the memory at the second time. For example, the output file can include the instructions: At a first time, allocate 4 GB of memory from the memory to the database object for 1 hour. At a second time (subsequent to the first time), allocate 2 GB of memory to a different table for 3 hours. At a third time (subsequent to the second time), spill the database object from the memory. Examples of block 512 are described with respect to the memory allocation/deallocation determiner 208. In some embodiments, writing the output file 512 is further based on blocks 504, 506, 508, and/or 510. For example, using the illustration above, the allocation of the 4 GB of memory at the first time can be based at least in part on determining that the memory has at least 4 GB of memory to spare and has the capacity (e.g., as determined by the memory availability detector 206). In another example, using the illustration above, writing the output file is based on a characteristic of the memory, such as server memory in a cluster (e.g., the cluster 102), number of servers in a cluster, and/or the storage availability within the cluster.

In some embodiments, an API controls execution of the output file. For example, a client application can transmit a request to a job scheduler to schedule one or more jobs or one or more database operations to perform. Responsively, an API of the job scheduler can communicate with the job scheduler the request so that the job scheduler can generate the schedule indicating how job or database operations will be executed and write it to the output file as described herein. In an illustrative example, a client application (e.g., a web browser or application plugin) of the user device(s) 108 can request a job schedule to be generated and a corresponding API at the coordinating node 106 can perform a method (e.g., the process 500) to generate a job schedule and write a corresponding output file, which is then transmitted, over the network 110, back to the user device(s) 108.

Figure 6:
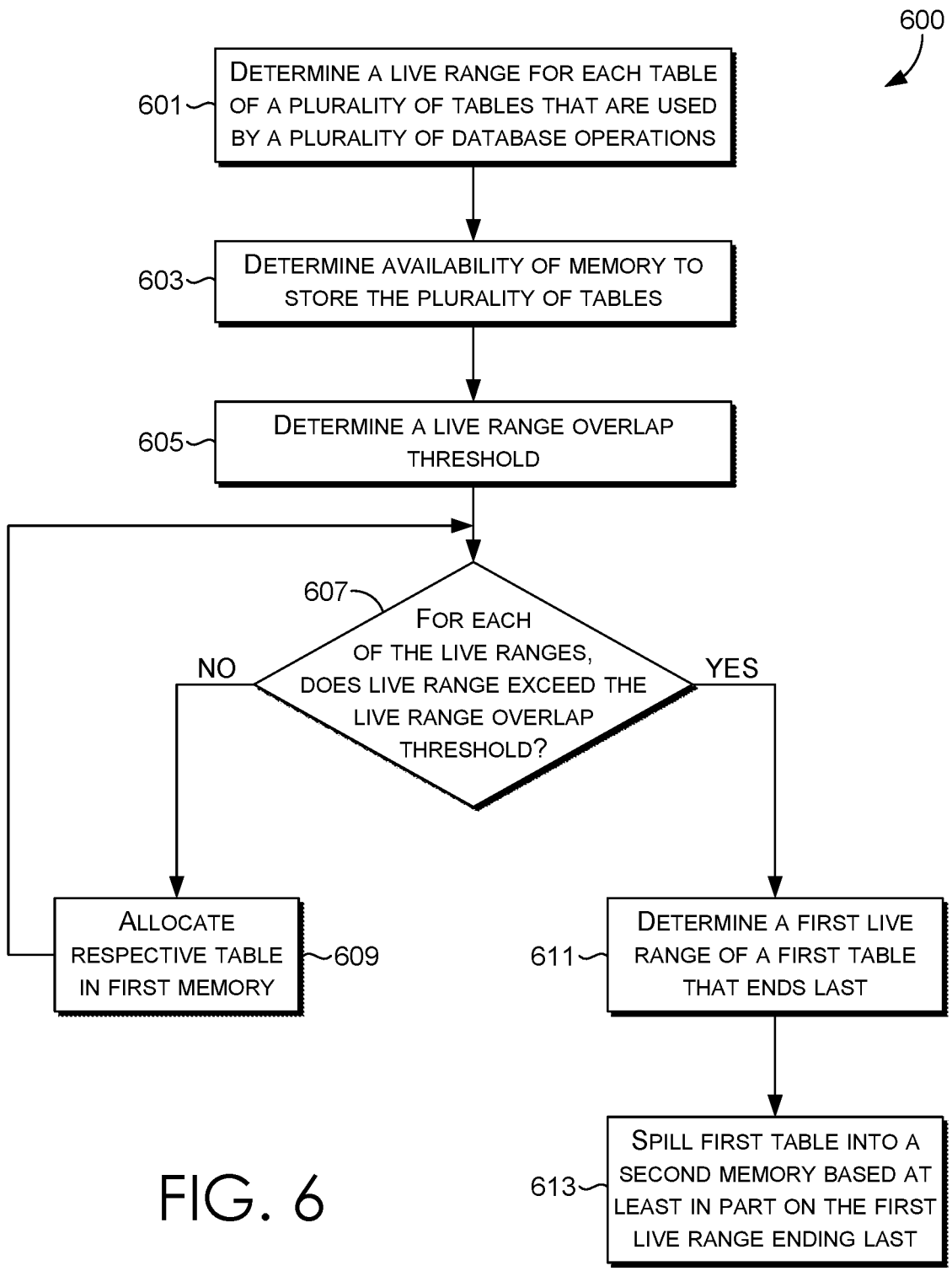
FIG. 6 is a flow diagram of an example process for allocating and deallocating database objects (e.g., tables) to memory, according to particular embodiments.

FIG. 6 is a flow diagram of an example process for allocating and deallocating database tables to memory, according to some embodiments. In some embodiments, the process 600 represents the functionality contained in blocks 506, 508, and/or 510 of the process 500. In some embodiments, the process 600 is performed by functionality as described with respect to the memory allocation/deallocation determiner 208 of FIG. 2. In some embodiments, the process 200 represents one or more portions of the variation of the linear scan algorithm, such as the pseudocode sequence described herein with respect to FIG. 4.

Per block 601, a live range is determined for each table of a plurality of tables that are used by a plurality of database operations. For example, as illustrated in FIG. 4, a live interval or live range is computed for database tables V, W, X, Y, and Z. In some embodiments, the plurality of database operations represent a set of pending dependent jobs that are waiting to be scheduled, such as illustrated in FIG. 3. For example, the plurality of database operations can include each database operation for jobs 0, 2, 6, 8, and 9 such that a live range is computed for each database object that each of these jobs need to access to be completed.

Per block 603, an availability of memory to store the plurality of database tables is determined. For example, memory capacity and utilization of various memory storage areas can be determined, as described, for instance, with respect to the memory availability detector 206 of FIG. 2.

Per block 605, a live range overlap threshold is determined. For example, the threshold may refer to one or more rules specifying that there may not be more than two or more (or any N quantity) of live intervals of different database tables that overlap, otherwise one of the database tables will be spilled. A "live range overlap" in various embodiments corresponds to different tables that are accessed at one or more common or shared corresponding points in some computer object. For example, referring back to FIG. 3, job 1 may need to access table 2 at a second level, point, or time sequence but job 2 may have to access table 1 during the same second level, point, or time sequence. Such second level, point, or time sequence in the context of FIG. 3 is after job 0 is processed (since job 0 must be completed first) but before job 5 or job 6 is processed (since job 1 and job 2 must be processed before job 5 and job 6 occur respectively). In another example, referring back to FIG. 4, database tables W and X overlap, as described herein.

Per block 607 it is determined, for each live range of the live ranges, if the corresponding live range exceed the live range overlap threshold. For example, referring back to FIG. 4, if database V is first accessed, representing the first step (e.g., job 0 of FIG. 3), the live range does not exceed the live range overlap threshold. Per block 609, if the live range does not exceed the live range threshold, then particular embodiments allocate the respective table in a first memory. For example, using the illustration above, the database V is allocated to a cluster cache identifier. In some embodiments, the allocation at block 609 is based at least in part on block 603 (e.g., determining available cluster caches). Responsive to block 609, a loop is performed back up to block 607 such that it is determined, for another live range of a different database table, whether the live range exceeds the live range overlap threshold.

Per block 611, if the particular live range does exceed the live range overlap threshold, a first live range of a first table that ends last (as defined in some computer object) is determined. For example, referring back to FIG. 4, the live range or interval of database table X is the database table that ends lasts or is the point (e.g., basic block or node) furthest from a current point (e.g., a beginning node). Per block 613, embodiments spill the first table into a second memory based at least in part on the first live range ending last at block 611. For example, referring back to FIG. 4, table X is spilled because it has a live range that ends last. In some embodiments, the allocation at block 609 is based at least in part on block 603 (e.g., determining available cluster caches).

Figure 7:
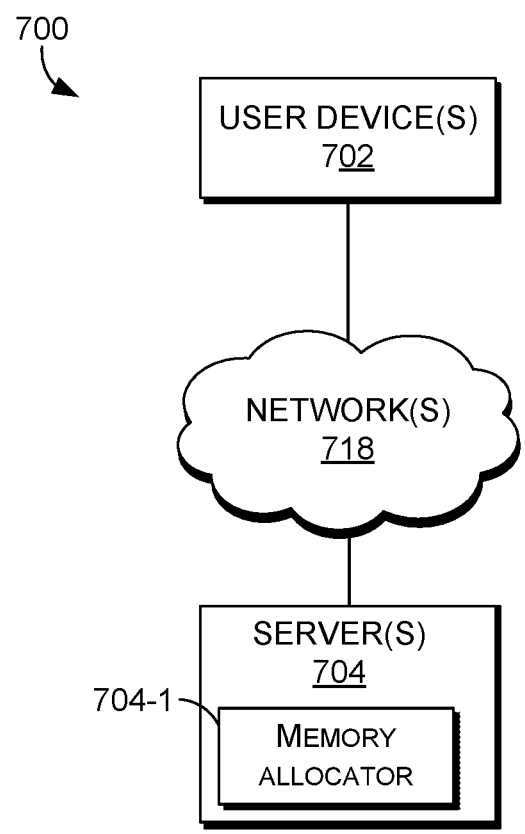
FIG. 7 is a block diagram of a computing environment in which aspects of the present technology are implemented within, according to particular embodiments.

FIG. 7 is a block diagram of a computing environment 700 in which aspects of the present disclosure are employed in, according to certain embodiments. Although the environment 700 illustrates specific components at a specific quantity, it is recognized that more or less components may be included in the computing environment 700. For example, in some embodiments, there are multiple user devices 702 and multiple servers 704, such as nodes in a cloud or distributing computing environment. In some embodiments, some or each of the components of the system 200 of FIG. 2 are hosted in the one or more servers 704. In some embodiments, the user device(s) 702 and/or the server(s) 704 may be embodied in any physical hardware, such as the computing device 800 of FIG. 8.

The one or more user devices 702 are communicatively coupled to the server(s) 704 via the one or more networks 718. In practice, the connection may be any viable data transport network, such as, for example, a LAN or WAN. Network(s) 718 can be for example, a local area network (LAN), a wide area network (WAN) such as the Internet, or a combination of the two, and include wired, wireless, or fiber optic connections. In general, network(s) 718 can be any combination of connections and protocols that will support communications between the control server(s) 704 and the user devices 702.

The one or more servers 704 include the memory allocator 704. In some embodiments, the memory allocator 704-1 represents the memory allocator 106-1 of FIG. 1, and/or the memory allocation/deallocation determiner 208 of FIG. 2.

In some embodiments, a user issues a query on the one or more user devices 702, after which the user device(s) 702 communicate, via the network(s) 718, to the one or more servers 704 and the one or more servers 704 executes the query (e.g., via one or more components of FIG. 2) and causes or provides for display information back to the user device(s) 702. For example, the user may issue a query at the user device 702 that specifies one or more database operations to perform and/or for one or more jobs to be scheduled. Responsively, the one or more servers 704 execute the query by rendering database information (e.g., views of tables, rows, columns, etc.) and/or causing display of an output file that illustrates a candidate manner that one or more jobs are to be scheduled (e.g., as described with respect to block 512).

The invention may be described in the general context of computer code or machine-useable instructions, including computer-executable instructions such as program modules, being executed by a computer (or one or more processors) or other machine, such as a personal data assistant or other handheld device. Generally, program modules including routines, programs, objects, components, data structures, etc., refer to code that perform particular tasks or implement particular abstract data types. The invention may be practiced in a variety of system configurations, including handheld devices, consumer electronics, general-purpose computers, more specialty computing devices, etc. The invention may also be practiced in distributed computing environments where tasks are performed by remote-processing devices that are linked through a communications network.

Figure 8:
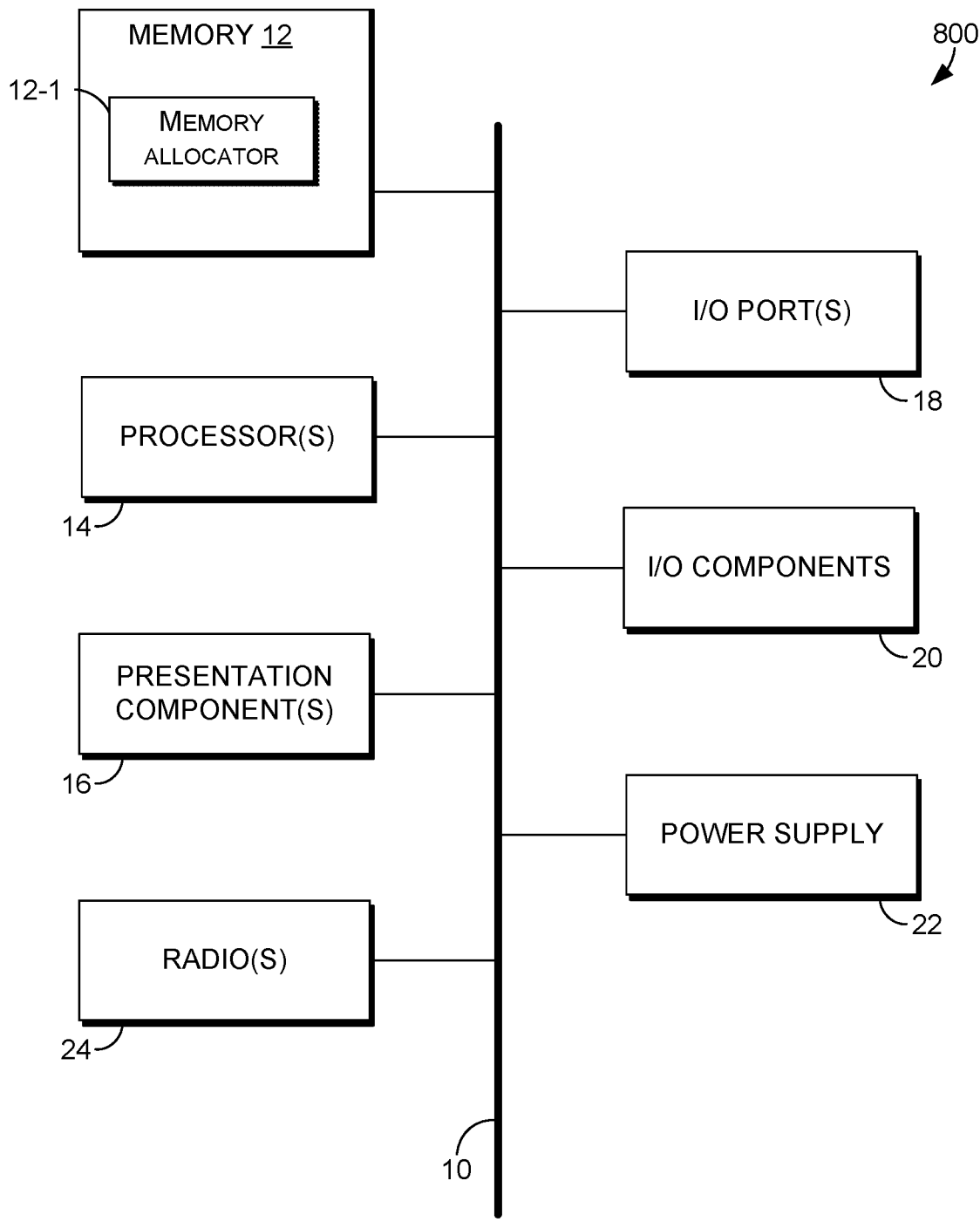
FIG. 8 is a block diagram of a computing device in which aspects of the present disclosure are implemented within, according to particular embodiments.

With reference to FIG. 8, computing device 800 includes bus 10 that directly or indirectly couples the following devices: memory 12, one or more processors 14, one or more presentation components 16, input/output (I/O) ports 18, input/output components 20, and illustrative power supply 22. Bus 10 represents what may be one or more busses (such as an address bus, data bus, or combination thereof). Although the various blocks of FIG. 8 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that this diagram is merely illustrative of an exemplary computing device that can be used in connection with one or more embodiments of the present invention. Distinction is not made between such categories as "workstation," "server," "laptop," "hand-held device," etc., as all are contemplated within the scope of FIG. 8 and reference to "computing device."

In some embodiments, the computing device 800 represents the physical embodiments of one or more systems and/or components described above. For example, the computing device 800 can represent: the one or more user devices 702, the server(s) 704 of FIG. 7, each corresponding node 104-1, 104-2, and 104-3, and/or the user device(s) 108. The computing device 800 can also perform some or each of the blocks in the process 500, 600 and/or any functionality described herein with respect to FIGS. 1-7. It is understood that the computing device 800 is not to be construed necessarily as a generic computer that performs generic functions. Rather, the computing device 800 in some embodiments is a particular machine or special-purpose computer. For example, in some embodiments, the computing device 800 is or includes: a multi-user mainframe computer system, one or more cloud computing nodes, a single-user system, or a server computer or similar device that has little or no direct user interface, but receives requests from other computer systems (clients), a desktop computer, portable computer, laptop or notebook computer, tablet computer, pocket computer, telephone, smart phone, smart watch, or any other suitable type of electronic device.

Computing device 800 typically includes a variety of computer-readable media. Computer-readable media can be any available media that can be accessed by computing device 800 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 800. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 12 includes computer storage media in the form of volatile and/or nonvolatile memory. The memory may be removable, non-removable, or a combination thereof. Exemplary hardware devices include solid-state memory, hard drives, optical-disc drives, etc. Computing device 800 includes one or more processors 14 that read data from various entities such as memory 12 or I/O components 20. Presentation component(s) 16 present data indications to a user or other device. Exemplary presentation components include a display device, speaker, printing component, vibrating component, etc. Memory 12 includes the memory allocator 12-1. In some embodiments, the memory allocator 12-1 represents the memory allocator 704-1 of FIG. 7, the memory allocator 106-1 of FIG. 1, and/or the memory allocation/deallocation determiner 208 of FIG. 2.

I/O ports 18 allow computing device 800 to be logically coupled to other devices including I/O components 20, some of which may be built in. Illustrative components include a microphone, joystick, game pad, satellite dish, scanner, printer, wireless device, etc. The I/O components 20 may provide a natural user interface (NUI) that processes air gestures, voice, or other physiological inputs generated by a user. In some instance, inputs may be transmitted to an appropriate network element for further processing. A NUI may implement any combination of speech recognition, touch and stylus recognition, facial recognition, biometric recognition, gesture recognition both on screen and adjacent to the screen, air gestures, head and eye-tracking, and touch recognition associated with displays on the computing device 800. The computing device 700 may be equipped with depth cameras, such as, stereoscopic camera systems, infrared camera systems, RGB camera systems, and combinations of these for gesture detection and recognition. Additionally, the computing device 700 may be equipped with accelerometers or gyroscopes that enable detection of motion.

As described above, implementations of the present disclosure relate to automatically generating a user interface or rendering one or more applications based on contextual data received about a particular user. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and sub combinations are of utility and may be employed without reference to other features and sub combinations. This is contemplated by and is within the scope of the claims.

DEFINITIONS

"And/or" is the inclusive disjunction, also known as the logical disjunction and commonly known as the "inclusive or." For example, the phrase "A, B, and/or C," means that at least one of A or B or C is true; and "A, B, and/or C" is only false if each of A and B and C is false.

A "set of" items means there exists one or more items; there must exist at least one item, but there can also be two, three, or more items. A "subset of" items means there exists one or more items within a grouping of items that contain a common characteristic.

A "plurality of" items means there exists more than one item; there must exist at least two items, but there can also be three, four, or more items.

"Includes" and any variants (e.g., including, include, etc.) means, unless explicitly noted otherwise, "includes, but is not necessarily limited to."

A "user" or a "subscriber" includes, but is not necessarily limited to: (i) a single individual human; (ii) an artificial intelligence entity with sufficient intelligence to act in the place of a single individual human or more than one human; (iii) a business entity for which actions are being taken by a single individual human or more than one human; and/or (iv) a combination of any one or more related "users" or "subscribers" acting as a single "user" or "subscriber."

The terms "receive," "provide," "send," "input," "output," and "report" should not be taken to indicate or imply, unless otherwise explicitly specified: (i) any particular degree of directness with respect to the relationship between an object and a subject; and/or (ii) a presence or absence of a set of intermediate components, intermediate actions, and/or things interposed between an object and a subject.

A "module" or "component" is any set of hardware, firmware, and/or software that operatively works to do a function, without regard to whether the module is: (i) in a single local proximity; (ii) distributed over a wide area; (iii) in a single proximity within a larger piece of software code; (iv) located within a single piece of software code; (v) located in a single storage device, memory, or medium; (vi) mechanically connected; (vii) electrically connected; and/or (viii) connected in data communication. A "sub-module" is a "module" within a "module."

The terms first (e.g., first cache), second (e.g., second cache), etc. are not to be construed as denoting or implying order or time sequences unless expressly indicated otherwise. Rather, they are to be construed as distinguishing two or more elements. In some embodiments, the two or more elements, although distinguishable, have the same makeup. For example, a first memory and a second memory may indeed be two separate memories but they both may be RAM devices that have the same storage capacity (e.g., 4 GB).

The term "causing" or "cause" means that one or more systems (e.g., computing devices) and/or components (e.g., processors) may in in isolation or in combination with other systems and/or components bring about or help bring about a particular result or effect. For example, a server computing device may "cause" a message to be displayed to a user device (e.g., via transmitting a message to the user device) and/or the same user device may "cause" the same message to be displayed (e.g., via a processor that executes instructions and data in a display memory of the user device). Accordingly, one or both systems may in isolation or together "cause" the effect of displaying a message.

What is claimed is:

1. A computerized system comprising:
 one or more processors; and
 computer storage memory having computer-executable instructions stored thereon which, when executed by the one or more processors, implement a method comprising:
 determining a database object used by a plurality of database jobs, each database job including at least one of: a plurality of reads, a plurality of writes, or a read and a write to the database object;
 computing a live range of the database object, the computing of the live range includes determining that the database object is to be accessed by a first database job before any other database jobs of the plurality of database jobs, wherein the computing of the live range includes determining that the database object is to be accessed last by a second database job, and wherein no other database job, of the plurality of database jobs, accesses the database object after the second database job;
 based at least in part on the live range of the database object and at least one characteristic of a cache, determining that the cache is to store the database object;
 based on the determining that the database object is accessed by the first database job before any other database jobs, determining a first time to allocate the database object to the cache;

based on the determining that the database object is accessed last by the second database job, determining a second time to deallocate the database object from the cache; and writing an output file comprising a first instruction to store the database object in the cache at the first time and a second instruction to deallocate the database object from the cache at the second time.

2. The system of claim 1, wherein the first time is determined using a variation of a linear scan register algorithm.

3. The system of claim 1, wherein the first time is determined using a variation of a color graph algorithm.

4. The system of claim 1, wherein the cache is located in a cluster of servers.

5. The system of claim 1, wherein the characteristic of the cache is stored in associated with an identifier of the cache, and the characteristic is any one of server memory in a cluster, number of servers in the cluster, or storage availability within the cluster.

6. The system of claim 1, wherein the cache and the database object are stored in a cloud, and an application programming interface controls execution of the output file.

7. The system of claim 1, wherein each databased job, of the plurality of database jobs, includes an Extract, Transform, and Load (ETL) database job.

8. A computer-implemented method comprising:
determining a database object used in a plurality of database jobs, each database job including at least one of: a read, a write, or a read and a write to the database object;
computing a live range of the database object, the computing of the live range includes determining that the database object is to be accessed by a first database job before any other database jobs of the plurality of database jobs, wherein the computing of the live range includes determining that the database object is to be accessed last by a second database job, and wherein no other database job, of the plurality of database jobs, accesses the database object after the second database job;
based at least in part on the live range of the database object and at least one characteristic of a memory, determining that the memory is to store the database object;
based on the determining that the database object is accessed by the first database job before any other database jobs, determining a first time to allocate the database object to the memory;
based on the determining that the database object is accessed last by the second database job, determining a second time to deallocate the database object from the memory; and
writing an output file comprising a first instruction to store the database object in the memory at the first time and a second instruction to deallocate the database object from the memory at the second time.

9. The method of claim 8, wherein the first time is determined using a variation of a linear scan register algorithm.

10. The method of claim 8, wherein the first time is determined using a variation of a color graph algorithm.

11. The method of claim 8, wherein the memory is located in a cluster of servers.

12. The method of claim 8, wherein the characteristic of the memory is stored in associated with an identifier of the memory, and the characteristic is any one of server memory in a cluster, number of servers in the cluster, or storage availability within the cluster.

13. The method of claim 8, wherein the memory and the database object are stored in a cloud, and an application programming interface controls execution of the output file.

14. The method of claim 8, wherein the plurality of database jobs include an Extract, Transform, and Load (ETL) database job.

15. One or more computer storage media having computer-executable instructions embodied thereon that, when executed, by one or more processors, cause the one or more processors to perform a method, the method comprising:
determining a database object used in a plurality of database jobs, each database job including at least one of: a read, a write, or a read and a write to the database object;
computing a live range of the database object, the computing of the live range includes determining that the database object is to be accessed by a first database job before any other database jobs of the plurality of database jobs, wherein the computing of the live range includes determining that the database object is to be accessed last by a second database job, and wherein no other database job, of the plurality of database jobs, accesses the database object after the second database job;
based at least in part on the live range of the database object and at least one characteristic of a memory, determining that the memory is to store at least a portion of the database object based;
based on the determining that the database object is accessed by the first database job before any other database jobs, determining a first time to allocate at least the portion of database object to the memory;
based on the determining that the database object is accessed last by the second database job, determining a second time to deallocate at least the portion of the database object from the memory; and
writing an output file comprising a first instruction to store at least the portion of the database object in the memory at the first time and a second instruction to deallocate at least the portion of the database object from the memory at the second time.

16. The one or more storage media of claim 15, wherein the first time is determined using a variation of a linear scan register algorithm.

17. The one or more storage media of claim 15, wherein the first time is determined using a variation of a color graph algorithm.

18. The one or more storage media of claim 15, wherein the memory is located in a cluster of servers.

19. The one or more storage media of claim 15, wherein the characteristic of the memory is stored in associated with an identifier of the memory, and the characteristic is any one of server memory in a cluster, number of servers in the cluster, or storage availability within the cluster.

20. The one or more storage media of claim 15, wherein the database jobs include an Extract, Transform, and Load (ETL) database job.

* * * * *